United States Patent
Lau et al.

(10) Patent No.: US 8,984,348 B2
(45) Date of Patent: *Mar. 17, 2015

(54) SEMI-AUTOMATIC CONVERSION AND EXECUTION OF FUNCTIONAL MANUAL TESTS

(75) Inventors: Tessa A. Lau, Mountain View, CA (US); Jalal U. Mahmud, San Jose, CA (US); Pablo Pedemonte, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 13/589,325

(22) Filed: Aug. 20, 2012

(65) Prior Publication Data

US 2013/0227366 A1 Aug. 29, 2013

Related U.S. Application Data

(63) Continuation of application No. 13/407,593, filed on Feb. 28, 2012, now Pat. No. 8,799,720.

(51) Int. Cl.
*G06F 11/00* (2006.01)
*G06F 11/36* (2006.01)

(52) U.S. Cl.
CPC ........ *G06F 11/3688* (2013.01); *G06F 11/3684* (2013.01)
USPC .......................................... 714/46; 714/38.1

(58) Field of Classification Search
CPC ............ G06F 11/3612; G06F 11/3664; G06F 11/3684
USPC ............................. 714/32, 46, 38.1; 717/124
See application file for complete search history.

(56) References Cited

U.S. PATENT DOCUMENTS

| 6,698,012 B1 | 2/2004 | Kossatchev et al. |
| 7,689,973 B2 | 3/2010 | Kwong et al. |
| 7,954,091 B2 | 5/2011 | Li et al. |

(Continued)

FOREIGN PATENT DOCUMENTS

WO 2008092345 8/2008

OTHER PUBLICATIONS

"Transformation of a User Model Into User Interface Test Cases," IBM, IPCOM000180307D, Mar. 6, 2009.

(Continued)

*Primary Examiner* — Joshua Lohn
(74) *Attorney, Agent, or Firm* — Fleit Gibbons Gutman Bongini & Bianco PL; Thomas Grzesik (57) ABSTRACT

Embodiments of the invention relate to the conversion and execution of functional tests. In one embodiment, a current test step of a manual functional test is executed. The test includes a set of test steps each including at least one action and one target of the action. The test is associated with an application that includes a plurality of objects to be tested. At least two of the objects are determined to be associated with the target of the test step. A user is prompted to provide a selection of one of the at least objects for association with the target of the test step. A new test step is generated. The new test step associates the object selected by the user with the target of the current test step. The new test step is designated for automatic execution in place of the current test step for subsequent executions thereof.

9 Claims, 8 Drawing Sheets

(56) References Cited

U.S. PATENT DOCUMENTS

| | | | | |
|---|---|---|---|---|
| 8,271,232 | B1* | 9/2012 | Roucis et al. | 702/182 |
| 2004/0194054 | A1* | 9/2004 | McGrath et al. | 717/100 |
| 2005/0268285 | A1* | 12/2005 | Bagley et al. | 717/124 |
| 2006/0156287 | A1* | 7/2006 | Vikram | 717/124 |
| 2007/0022406 | A1* | 1/2007 | Liu | 717/124 |
| 2010/0275062 | A1* | 10/2010 | Ur | 714/32 |
| 2011/0004868 | A1* | 1/2011 | Bharadwaj | 717/135 |
| 2011/0307868 | A1* | 12/2011 | Schwartz et al. | 717/127 |
| 2013/0042222 | A1* | 2/2013 | Maddela | 717/124 |
| 2013/0227351 | A1* | 8/2013 | Lau et al. | 714/46 |
| 2013/0227366 | A1* | 8/2013 | Lau et al. | 714/735 |

OTHER PUBLICATIONS

"A Correlative Test Plan Model for Various Test Stages," Disclosed Anonymously, IPCOM000199941D, Sep. 21, 2012.

"Method and System for Transforming Test Case to Test Script Using Automated GUI Objects Identification," Disclosed Anonymously, IPCOM000202327D, Dec. 14, 2012.

Chen, D.L., et al., "Learning to Interpret Natural Language Navigation Instructions from Observations," in Proc. of the Twenty-Fifth AAAI Conference on Artificial Intelligence, 2011.

Leshed, G., et al., "CoScripter: Automating & Sharing How-To Knowledge in the Enterprise," in Proc. of the 25th Annual SIGCHI Conf. on Human Factors in Computing Systems, CHI'08, pp. 1719-1728, 2008.

Lau, T., et al., "Interpreting Written How-To Instructions," In Proc. of the 21st International Joint Conf. on Artificial Intelligence, pp. 1433-1438, 2009.

Kollar, T., et al., "Toward Understanding Natural Language Directions," in Proc. of the 5th ACM/IEEE Intl. Conf. on Human-Robot Interaction, HRI'0, pp. 259-266, 2010.

Shimizu, N., "Semantic Discourse Segmentation and Labeling for Route Instructions," in Proc. of the 21st Intl. Conf. on Computational Linguistics, COLING ACL'06, pp. 31-36, 2006.

Shimzu, N., et al., "Learning to Follow Navigational Route Instructions," in Proc. of the 21st Intl. Joint Conf. on Articial Intelligence, pp. 1488-1493, 2009.

Tjong. E.F., et al., "Introduction to the CoNLL-2000 Shared Task: Chunking," in Proc. of the 2nd Workshop on Learning Language in Logic and the 4th Conf. on Computational Natural Language Learning, vol. 7, ConLL'00, pp. 127-132, 2000.

Thummalapenta, S., et al., "Automating Test Automation," Technical Report RI110145, IBM Research, 2011.

Abney, S., "Parsing by chunks", Principle-Based Parsing: Computation and Psycholinguistics, Nov. 10, 1994, pp. 1-18.

Brill, E., "A simple rule-based part of speech tagger", In Proceedings of the third conference on Applied natural language processing, ANLC '92, pp. 152-155. Mar. 1992.

Tichy, W., et al., "Text to software: developing tools to close the gaps in software engineering", Proceedings of the FSE/SDP workshop on Future of software engineering research, Nov. 7-8, 2010, pp. 379-384.

Cortes, C., et al., "Support-Vector Networks", Machine Learning, Mar. 1995, pp. 1-25, vol. 20, Issue 3. Kluwer Academic Publishing.

Dustin, E., et al., "Automated software testing: introduction, management, and performance", Jul. 1999, pp. 1-608. Addison-Wesley Professional.

Fantechi, A., et al., "Application of Linguistic Techniques for Use Case Analysis", Proceedings of the 10th Anniversary IEEE Joint international conference on Requirements engineering, Sep. 2002, pp. 157-164.

Davis, C., et al., "Software Test Engineering with IBM Rational Functional Tester: The Definitive Resource", IBM Press, Oct. 23, 2009, pp. 1-696.

Kit, E., et al., "Software testing in the real world: improving the process", ACM Press, Nov. 7, 1995, pp. 1-272. Addison-Wesley Professional publishing.

Lafferty, J., et al., "Conditional random fields: Probabilistic models for segmenting and labeling sequence data" Proceedings of the 18th international conference on Machine learning, ICML'01, Jun. 28, 2001, pp. 282-289.

Manber, U., et al., "Suffix arrays: a new method for on-line string searches", Proceedings of the first annual ACM-SIAM symposium on Discrete algorithms. Aug. 1991, pp. 1-16.

Ramshaw, L, et al., "Text chunking using transformation-based learning", Proceedings of the Third Annual Workshop on Very Large Corpora, May 1995, pp. 82-94.

Sutton, S., "Text2Test: Automated inspection of natural language use cases", Proceedings of the 3rd international conference on Software Testing, Verification and Validation. Oct. 2009, pp. 1-11.

Sinha, A., et al., "An analysis engine for dependable elicitation of natural language use case description and its application to industrial use cases", In DSN 2009, Dec. 18, 2008, pp. 1-12.

Notice of Allowance dated Mar. 27, 2014 received for U.S Appl. No. 13/407,593.

\* cited by examiner

500 procedure *interpret* (*st*, *s*,(*A*, *T*, *D*)):
$es \leftarrow \{ e \in st \mid label(st, e) = T.l \wedge$
$\qquad (T.t = \bullet \vee T.t = type(e))\}$

If $|es| = \varnothing$
  *error* ("Invalid tuple")
If $|es| > 1$
  $es \leftarrow heuristicDisamb\ (es, (A, T, D))$
if $|es| > 1$
  $(e, s') \leftarrow userDisamb\ (es, s)$
else
  $e \leftarrow$ the only element in $es$
  $s' \leftarrow s$
$st' \leftarrow apply\ ((A, T, D), e)$
return $(st', s')$

SEMI-AUTOMATIC CONVERSION AND EXECUTION OF FUNCTIONAL MANUAL TESTS

CROSS-REFERENCE TO RELATED APPLICATIONS

This application is continuation of and claims priority from U.S. patent application Ser. No. 13/407,593 filed on Feb. 28, 2012, now U.S. Pat. No. 8,799,720; the entire disclosure is herein incorporated by reference in its entirety.

BACKGROUND

The present invention generally relates to application testing, and more particularly relates to the conversion and execution of functional tests.

Testing of applications can be an expensive task whose effectiveness is crucial to a project's success. One type of test for testing an application is a functional test. Functional tests verify that a system complies with its specifications and requirements, ignoring internal details such as code, design, or architecture. Currently, functional testing is generally performed manually. For example, system functionality is verified by human testers, following hand-written instructions detailing how to feed a system with some input, and the expected outputs. This situation is particularly problematic for large, long-lived projects, which might carry hundreds of legacy functional tests. Periodically executing such tests by manual means can take a considerable amount of time and resources.

BRIEF SUMMARY

In one embodiment a method is disclosed. The method comprises executing a current test step of a functional test. The functional test comprises a set of test steps, where each of the test steps comprises at least one action and one target of the action. The functional test is associated with an application comprising a plurality of objects to be tested. At least two of the objects in the plurality of objects are determined to be associated with a target of the current test step. A user is prompted to provide a selection of one of the at least two objects for association with the target of the current test step. A new test step corresponding to the current test step being executed is generated based on a selection by the user of one of the at least two objects. The new test step associates the object selected by the user with the target of the current test step. The new test step is designated for automatic execution in place of the current test step for subsequent executions of the current test step.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
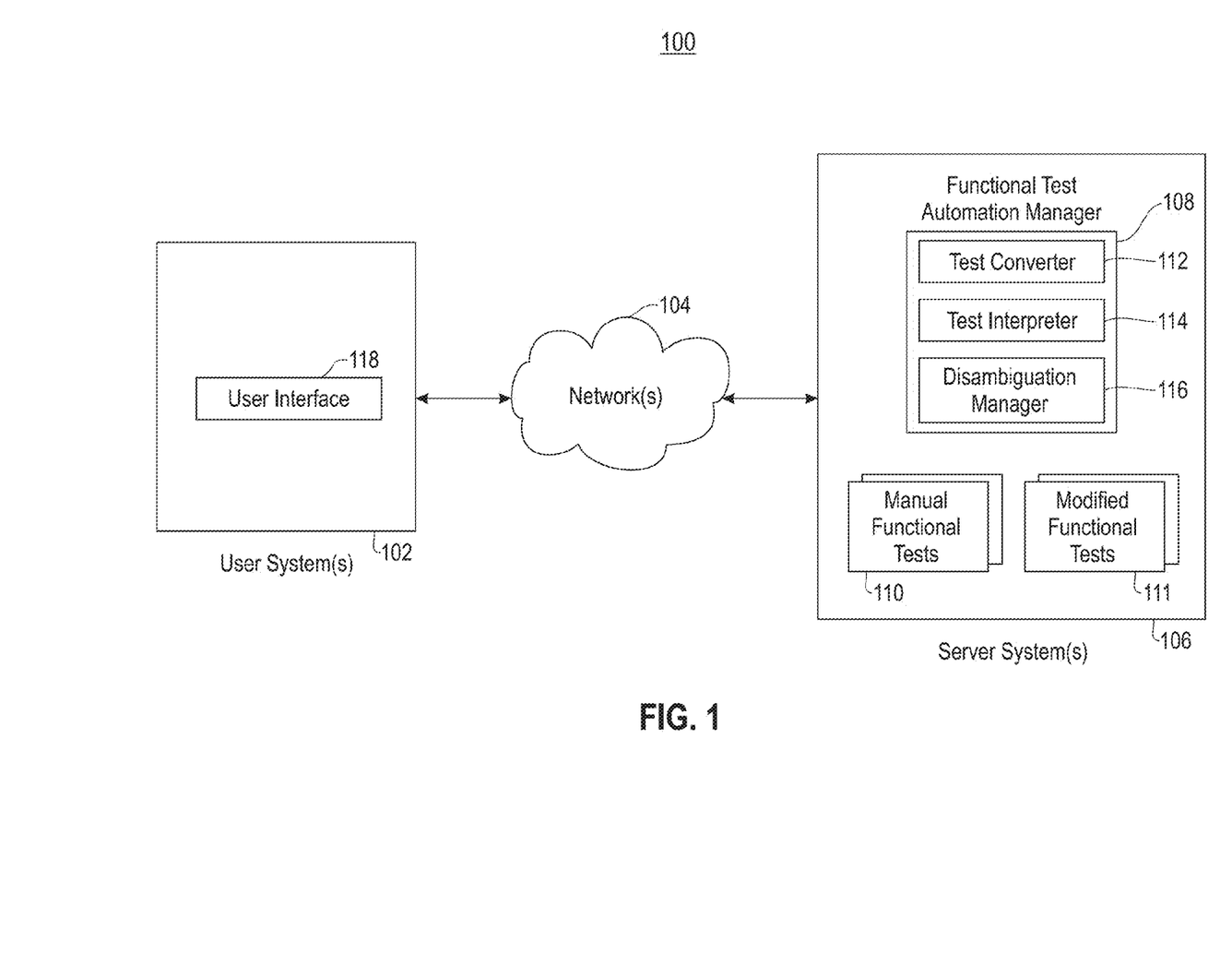
FIG. 1 is a block diagram illustrating one example of an operating environment according to one embodiment of the present invention.

FIG. 1 shows one example of an operating environment 100 applicable to various embodiments of the present invention. As shown, one or more user systems 102 are communicatively coupled to one or more networks 104. Additionally, one or more server systems 106 are communicatively coupled to the network(s) 104 as well. The network(s) 104, in this embodiment, is a wide area network, local area network, wired network, wireless network, and/or the like. The server system 106 comprises a functional test automation manager 108 that at least performs semi-automatic conversion and execution of manual functional tests 110 defined by users. Functional tests are tests comprising test cases based on the specifications of the software component under test. Functional tests verify that a system complies with its specifications and requirements while disregarding internal details such as code, design, or architecture. Manual functional tests are functional tests comprising steps that are manually performed by a human.

The test automation manager 108, in this embodiment, comprises a test converter 112, a test interpreter 114, and a disambiguation manager 116. Each of these components is discussed in greater detail below. Users of the user systems 102 interact with the server system 106 via an interface 118 or programmatically via an API(s). The users are able to submit one or more manual functional tests 110 to the server system 106 and interact with the functional test automation manager 108 via the user interface 118 and/or API(s). For example, the user can receive messages, prompts, queries, notifications, etc. from the functional test automation manager 108. It should be noted that although FIG. 1 shows the functional test automation manager 108 being stored on a system 106 that is separate from the user system 102, the functional test automation manager 108 can also reside at the user system 102 as well.

In one embodiment, the test automation manager 108 automates a manual functional test 110 using a multi-stage process. One stage of this process converts a manual functional test into an intermediate representation that is amenable for automated execution. Another stage interprets the intermediate representation with user guidance when needed. The test automation manager 108 processes a manual functional test 110 step by step, converting, and interpreting each step in turn. One problem with understanding natural language is that it is imprecise, so the meaning of a hand-written instruction might not be unambiguously determined. Therefore, while executing a test 110 if the test automation manager 108 identifies an instruction whose meaning cannot be precisely determined the test automation manager 108 queries/prompts the user for guidance. In this situation the test automation manager 108 queries the user on how to proceed. The process of prompting a user can be referred to as a disambiguation process and is performed by the disambiguation manager 116 of the test automation manager 108. The test automation manager 108 utilizes the feedback received from a user to create a modified manual test 111 that can be executed automatically and that is based on the original test. This modified (new test) does not require any assistance from the user to be executed. It should be noted the term "executing" with respect to functional testing refers to executing software targets/objects of an application that are to be tested following step by step test instructions. One non-limiting example of software targets/objects are GUI elements of an application. Such test execution can be manual or automated (with the help of an automated tool).

Overview of Manual Functional Test Automation

Figure 2:
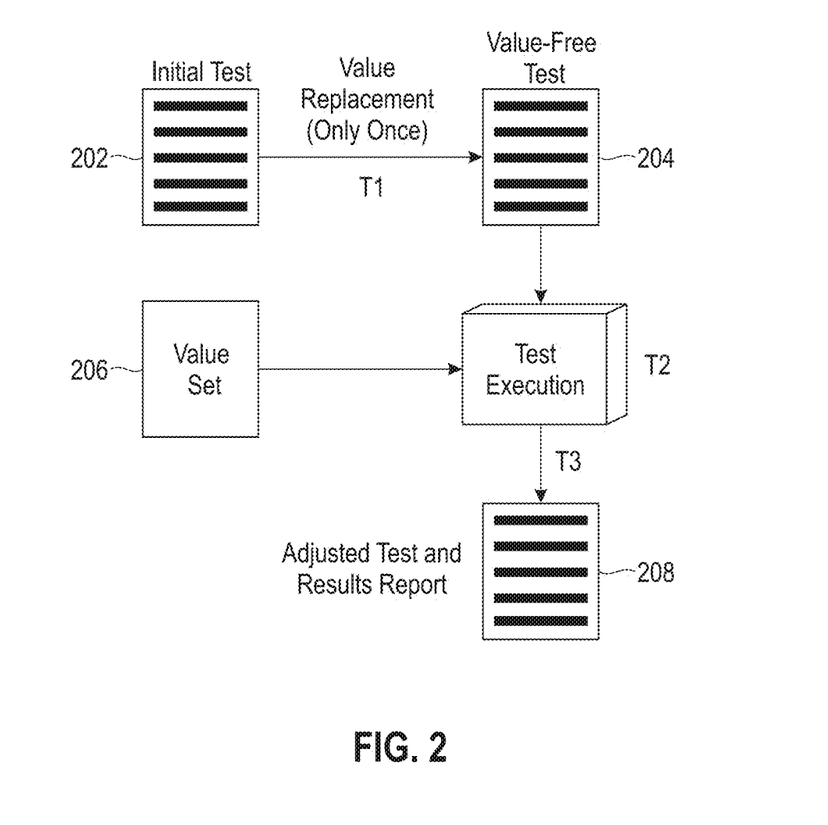
FIG. 2 is an operational flow diagram showing an overall process of a manual functional test automation process according to one embodiment of the present invention.

FIG. 2 shows an overview of the manual functional test automation process performed by the test automation manager 108. For example, FIG. 2 shows that an initial manual test 202 is received by the test automation manager 108 as an input. At T1, the test automation manager 108 performs a value replacement process (only once) on the initial test 202 to generate a value-free test 204. A manual test, in one embodiment, is defined as an ordered sequence $\{s_i\}$, $i \geq 1$, of test steps (or instructions). A value-free manual test is defined as a pair (M, vs), where M is a manual test whose literal values (such as "10" in type quantity 10) have been replaced by variables, and vs is an ordered set of values. A value-free test is a parameterized test that can be executed many times with different values, by providing distinct sets. The test automation manager 108 transforms a manual test into its value-free version by a manual value replacement process, which is discussed in greater detail below.

Given the value-free manual test 204, (M, vs), M=$\{s_i\}$, the test automation manager 108 executes the steps $s_i$ of the value-free manual test 204 in order of occurrence using a value set 206, at T2. At T3, the test automation manager 108 returns a new test 208, M'=$\{s'_i\}$, that defines the same actions as the initial test M 202, but does not require user intervention when executed. Stated differently, executing the initial test M 202 may require initial user intervention, but after the initial user intervention the test automation manager 108 generates a modified manual test M' 208, which is equivalent to M 202. This manual test M' 208 does not require any effort from the user to execute since any ambiguities were removed as a result of the disambiguation process.

Figure 3:
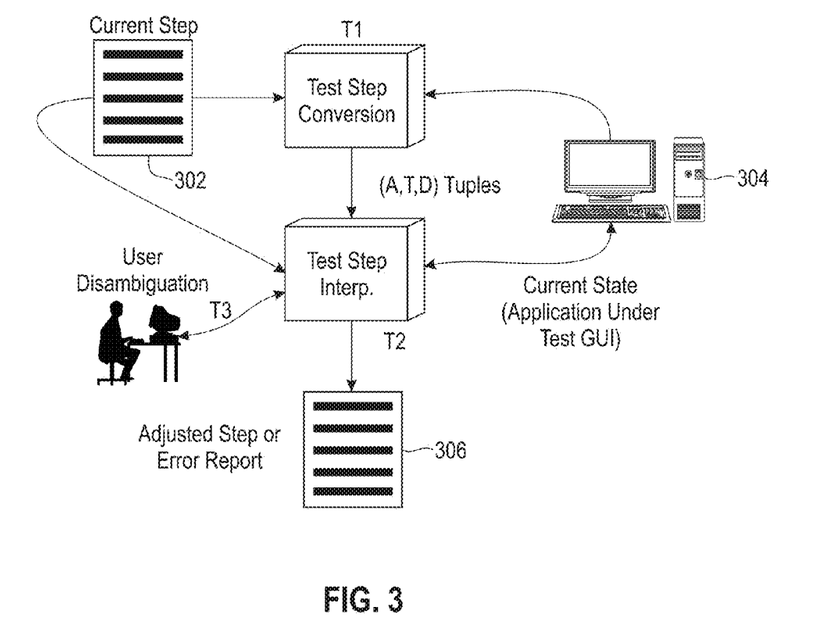
FIG. 3 is an operational flow diagram showing an overall process of executing a single test step during the manual functional test automation process of FIG. 2 according to one embodiment of the present invention.

When executing a single step of a manual test 110, the test automation manager 108 performs a multi-stage process. An overview of this multi-stage process is shown in FIG. 3. At T1, the test converter 112 of the test automation manager 108 converts a current step 302 of a test into an intermediate representation based on the current state 304 of the application under test. In one embodiment, the test converter 112 processes test steps as entities denoting actions to perform on target GUI (Graphical User Interface) elements of the application. Therefore, to execute a step the test converter 112 identifies (1) the actions denoted by the step; (2) the target for each action in the step; and (3) any additional data (if any) associated with an action. One example of this additional data is "enter", which includes the value to type in a text field.

Table 1 below shows one example of a manual functional test (herein referred to as "the example test") created by a user.

TABLE 1

1. enter the policy number as xxx-xxx-xxxx then press search
2. press reinstate button
3. enter the following
    effective date as mm-dd-yyyy
    paid indicator as "y"
    comments as "payment done"
4. press save button
5. validate system follows operational and referral rules The actions in Step 1 are "enter" and "press", and their respective targets are two GUI elements labeled "policy number" and "search". Moreover, the "enter" action has a policy number template as associated data. Targets can be specified either by a label alone (e.g., "search" in Step 1) or by a label and a target type (such as "save button" in Step 4). Targets specified only by a label are implicit. Therefore, the intermediate representation of a test step, in one embodiment, is defined as a tuple combining the action intended by the step, the target of the action, and any associated data if present. These are referred to as (A, T, D) tuples.

The current application state st can be defined as the combined state of all the GUI elements of the application at the present time. Performing an action on the application (e.g., entering some text) might change the GUI, and hence, the current state. Therefore, the test converter 112 converts a test step into an intermediate representation by taking a pair (st, s) representing the current application state and a test step to convert, and returning an ordered list of one or more tuples $\{(A_i, T_i, D_i)\}$, $i \geq 1$, one for each operation denoted by a step. This conversion process performed by the test converter 112 is referred to herein as "tuple extraction". Table 2 below shows the (A, T, D) tuples obtained from the example test shown above in Table 1. It should be noted that a "•" in the data component indicates that the tuple carries no data). It should also be noted that a test step can be converted into multiple tuples.

TABLE 2

| 1 | (enter, policy number, xxx-xxx-xxxx) |
| | (press, search, •) |
| 2 | (press, reinstate button, •) |
| 3 | (enter, effective date, mm-dd-yyyy) |
| | (enter, paid indicator, y) |
| | (enter, comments, payment done) |
| 4 | (press, save button, •) |

As can be seen from Table 2 above, there is no translation for Step 5 for the example test. Step 5 does not denote an action to apply on the application's GUI, but rather a verification step that the test automation manager 108 knows nothing about (even a tester attempting to execute this step might have trouble trying to find out what are the "operational and referral rules" that the system should follow). Therefore, in one embodiment, a translation is not performed for this type of step. However, other embodiments can process these types of steps to generate a translation.

Returning to FIG. 3, once the test converter 112 generates the intermediate representation 306 for current test step, the test interpreter 114 of the test automation manager 108 interprets the intermediate representation 306 on the application under test, at T2. The test interpreter 114 utilizes a function that takes the current application state st, the textual representation s of the current step, and a tuple (A, T, D) to interpret, which is obtained from converting s in the converting step of T1. If the test interpreter 114 determines that the meaning of the test step cannot be precisely determined the disambiguation manager 116 queries/prompts the user for guidance, at T3. The user can then provide any information required by the test interpreter 114 to determining the meaning of the step. The result of the interpretation process is a pair (st', s'), where st' is the new application state resulting from interpreting the tuple, and s' 306 an unambiguous version of the step s, based on the user's feedback if disambiguation took place. If user intervention was not required, s' is equal to s. Therefore, the result of running the test interpreter 114 on each step of a test M is a new test M' whose steps have been fully disambiguated. If the test interpreter 114 was unable to interpret the step an error report can be generated and displayed to the user as well.

In one embodiment, interpreting an (A, T, D) tuple involves applying the action A to the target denoted by T. Resolving the target involves finding a GUI element matching T. There can be multiple elements matching T. For example, consider a page having a search link and a search icon. Both elements will match the target in the tuple (click, search, •). It is likely that clicking either element will have the same effect, but this cannot be assumed in general. When the target of a tuple cannot be uniquely determined, the test interpreter 114 determines that the tuple's target is ambiguous. In some cases, this ambiguity can be overcome by inspecting the tuple to interpret. But in general, there may not be enough information to select the intended target.

Therefore, in one embodiment, let T.l be the label in the target specification, and T.t be the type (which will be the undefined value "•" if T is implicit). Let label be a function that given the application state and a GUI element computes/determines its label, and type a function that returns an element's type. Then, the set of elements e matching the target specification T is:

$$\{e \in \text{st} | T.l = \text{label}(st,e) \land (T.t = \bullet \lor T.t = \text{type}(e))\}$$

In one embodiment, when finding the candidate targets that match T the test automation manager 108 utilizes up-to-data application state data that reflects the effects of the steps interpreted previously. In other words, when the test interpreter 114 interprets the tuples obtained from a step $s_i$, the application under test is in a state reflecting the effect of the tuples for the steps $s_1 \ldots s_{i-1}$. One way to ensure that the application state data is up-to-date is to "thread" the state through the test interpreter 114, passing the current state to the function and returning a new state resulting from interpretation of the tuple. From here on in the process of interpreting the intermediate representation of a test step (i.e., a sequence of (A, T, D) tuples) is referred to as "tuple interpretation".

Tuple Extraction

Figure 4:
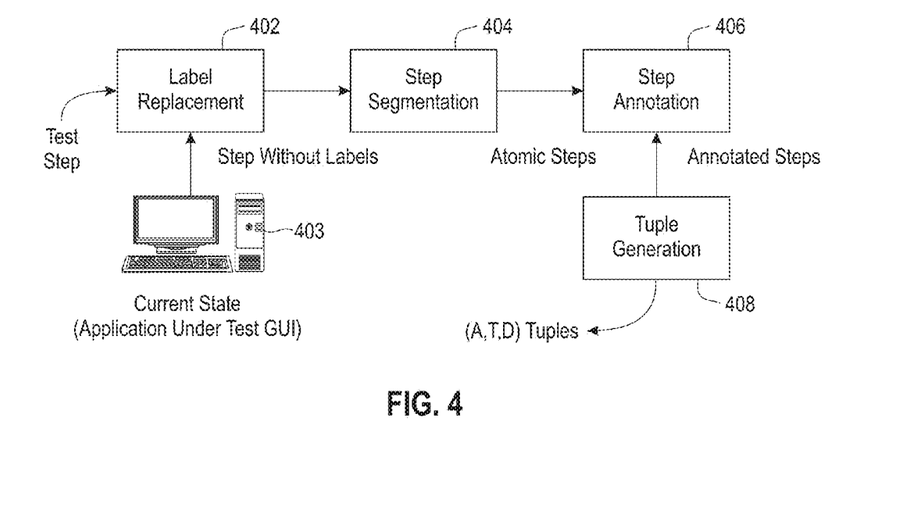
FIG. 4 is an operational flow diagram showing an overview of a tuple extraction process for automating a test step in a manual functional test automation process according to one embodiment of the present invention.

FIG. 4 shows an overview of the tuple extraction process performed by the test converter 112. The tuple extraction process extracts a sequence of (A, T, D) tuples from a step by performing a succession of fully automatic transformations. In particular, FIG. 4 shows that the tuple extraction process performed by the test converter 112 comprises multiple stages/processes. For example, the tuple extraction process comprises a label replacement process 402, a step segmentation process 404, a step annotation process 406, and a tuple generating process 408.

Using Step 1 of the test shown in Table 1 as an example, FIG. 4 shows that the test converter 112 receives this step as an input. The test converter 112 performs a value replacement operation on the test step. The value replacement operation transforms Step 1 into "enter policy number VALUE(0) then press search". Value replacement is advantageous since functional tests can be executed many times with different values. This can have an impact on the way that tests are written. For example, Step 1 instructs a user to enter a policy number following the pattern "xxx-xxx-xxxx", but provides no indication of the valid values that can be passed to the system in order to move on to Step 2. This is because the test is expected to be executed with different policy numbers. For example, one could verify that the system correctly processes different classes of policies, e.g., car accident and credit card insurance. This can complicate repeated test execution. For example, every time a test is executed, the test may need to be modified in order to provide new values.

The test automation manager 108, in one embodiment, overcomes this complication by abstracts out values from a functional test, namely value variables. Value variables have the form VALUE(i), referring to the $i^{th}$ value in an ordered set of values available at text execution. This way, Step 1 of the example test is transformed to "enter policy number as VALUE(0) then press Search", where the test is to be run with an ordered set of values holding a policy number at position 0. Value variables are useful in other cases where values are often missing, such as login instructions. A step such as "enter user name and password" can be converted into "enter user name VALUE(0) and password VALUE(1)", thus making the values explicit. In the value replacement stage users replace values in a test with variables and define one or more value sets. Similar to user disambiguation, value replacement is only necessary for the first execution of a test. If a test needs to be executed several times with different values, the test only needs to be re-executed with a different value set, as the test remains unchanged.

Returning to FIG. 4, once the value replacement process has been performed on Step 1 a label replacement process 402 is then performed on the test step. During the label replacement process 402, the test converter 112 replaces target labels in the test step with label variables. This process is similar to introducing value variables, but since the test converter 112 can query the current state of the application 403 for the available labels in the GUI, it is possible to automatically enumerate all the labels and remove their occurrences in the test step. The result of the label replacement process 402 is a simplified, less verbose test step. For example, after the label replacement process performed on Step 1, Step 1 becomes "enter LABEL(policy number) VALUE(0) then press LABEL(search)".

Note that this step denotes two actions "enter" and "press". Therefore, the step segmentation process 404 decomposes such a composite step into steps containing exactly one action verb, i.e., a verb that can act as the A component of a tuple. Such steps can be referred to as "atomic steps". In the current example, the segmentation process 404 outputs two atomic steps "enter LABEL(policy number) VALUE(0)" and "press LABEL(search)" for Step 1.

The step annotation process 406 identifies the tokens in each atomic step referring to the action, target, and data of the tuples that are intended to be obtained by the test converter 112. In the first atomic step, the step annotation process 406 identifies "enter" as the action, the LABEL as the (implicit)

target, and the VALUE as the associated data. In the second atomic step, "press" is the action and the LABEL the (again implicit) target. Based on this information, the tuple generation process 408 computes the two tuples, (enter, policy number, xxx-xxx-xxxx) and (press, search, •), shown above in TABLE 2.

Each of the above tuple extraction stages/processes are now discussed in greater detail. With respect to the label replacement process 402, there are cases where different instructions have the same underlying structure. For example, consider the steps: "click Add item to shopping cart icon" and "click Search button". If target labels are replaced with variables, where label variables are written as LABEL(l) and where l is the replaced target label, the above example becomes: "click LABEL(Add item to shopping cart) icon" and "click LABEL(Search) button".

Replacing labels with variables has the desirable effect of inducing a notion of a test step normal form that allows the test automation manager 108 to focus on the structure of the step. After label replacement, seemingly different steps can end up having the same structure. This simplifies the remaining stages of the extraction process, by reducing the number of forms that test steps can take. Also, label replacement results in shorter instructions where it is simpler to identify the components of the (A, T, D) tuples to extract. For example, in its original form "click Add item to shopping cart icon" has 7 tokens and after label replacement it has been reduced to 3 tokens ("click", a LABEL variable, and "icon"), which directly correspond to the step's action, target label, and target type. Label replacement also allows the test automation manager 108 to avoid complex labels that might prove problematic for later stages of the tuple extraction process.

The label replacement process 402 starts by tokenizing and POS (Part-Of-Speech) tagging the current step. One example of POS tagging is given in "A simple rule-based part of speech tagger", Eric Brill, *Proc. of the third conference on Applied natural language processing* in ANLC '92, pages 152-155, 1992, which is hereby incorporated by reference in its entirety. Then, the label replacement process 402 identifies target labels with the aid of a table holding all currently available labels. The label replacement process 402 computes the table by collecting the labels of all the elements in the application's GUI. Once this table is computed, the label replacement process 402 calculates all n-grams in the step using suffix arrays. One example of utilizing suffix arrays is given in "A simple rule-based part of speech tagger", Udi Manger and Gene Meyers, *Proc. of the third conference on Applied natural language processing* in ANLC '92, pages 152-155, 1992, which is hereby incorporated by reference in its entirety. Then, for each n-gram, the label replacement process 402 queries the table to check if it is a label. Various strategies can be implemented to ensure that false positives do not occur. For example, candidate unigrams POS-tagged as verbs can be discarded if they belong to a list of typical actions (e.g., click, select, type, enter, etc.). Also, n-grams that are included in another candidate n-gram can be ignored. The label replacement process 402 then replaces each matching n-gram l with a variable LABEL (l) POS-tagged with the NN tag (i.e., a noun).

The latter stages of the tuple extraction process work on atomic test steps, i.e., steps including exactly one action verb. The step segmentation process 404 computes the atomic constituents of a possibly composite test step. If the input step is already atomic, then this stage reduces to the identity function. One segmentation process that can be performed in this stage defines a set of delimiter words (e.g., "and" or "then"), using them to obtain the atomic instructions in a step. Using this approach the test step "enter user admin and password admin and click login" is segmented into the following steps "enter user admin", "password admin01", and "click login". However, the second step does not include an action verb and, therefore, is not atomic. The process can determine that the action is "enter" by inspecting the previous step, but this introduces dependencies on previous actions in the test.

Therefore, the step segmentation process 404 can avoid such backward dependencies by utilizing alternative criteria based on action verbs instead of delimiter words. The action verbs in the example step are "enter" (applied to two input fields) and "click" (applied to a button). These two action verbs map to the atomic instructions "enter user admin and password admin01" and "click login". Note that these steps are atomic, and atomic steps can denote more than one action (although they include only one action verb).

In one embodiment, the test convertor 112 assigns special labels to delimit atomic instructions in composite steps. One technique utilized by the test convertor 112 for assigning the labels is sentence chunking (also known as shallow parsing). A more detailed discussion on sentence chunking is given in "Parsing by Chunks", Steven P. Abney, *Principle-Based Parsing: Computation and Psycholinguistics*, pages 257-278, 1991, which is hereby incorporated by reference in its entirety. Sentence chunking typically divides text into syntactically related non-overlapping groups of words. Utilizing special labels to delimit atomic instructions in composite steps reduces the decomposition problem to sentence chunking with these labels. A convenient form for such delimiter labels is the BIO tagging mechanism. A more detailed discussion on BIO tagging is given in "Text Chunking using transformation-based learning", L. A. Ramshaw and M. P. Marcus, *Proc. of the Third Annual Workshop on Very Large Corpora*, pages 82-94, 1995, which is hereby incorporated by reference in its entirety. In this embodiment, a token either starts a step, is inside, or outside an atomic step. Therefore, the test convertor 112 only needs to assign three types of tags: B-CMD (beginning of a command), I-CMD (inside of a command), and O (outside of a command), respectively. For example, the example instruction would be chunked as shown in Table 3 below. With respect to the labels for the "and" tokens, the label is inside an atomic action, since password admin01 is not an atomic step. However, the second label is a delimiter for the two atomic instructions in the composite step.

TABLE 3

| | |
|---|---|
| enter | B-CMD |
| LABEL(user) | I-CMD |
| admin | I-CMD |
| and | I-CMD |
| LABEL(password) | I-CMD |
| admin01 | I-CMD |
| and | O |
| click | B-CMD |
| login | I-CMD |

Moving on to the step annotation process 406, the previous stage 404 transformed a possibly composite test step into a sequence of atomic instructions. In order to derive (A, T, D) tuples from an atomic step, the regions corresponding to the action, targets, and additional data in the step are identified. For that purpose, the step annotation process 406 annotates atomic steps using sentence chunking. However, at this stage a richer set of labels is obtained. In one embodiment, the following labels are utilized (other labels can also be utilized) in the step segmentation process 404:

ACT: action part of the step
TGT: target part of the step
VAL: data part of the step, if any
LOC: location information, explains how to reach a target
DSC: description of step's intention or effect.

The following instruction exemplifies how the step annotation process 406 annotates test steps: "In the LABEL (Sender Data) tab, enter anonymous in the LABEL(name) textbox for anonymous feedback". Note that this step is atomic, as it features a single action (enter some text). Table 3 below shows the labeling that is applied by the test converter 112 to this instruction:

TABLE 4

| In | B-LOC |
| the | I-LOC |
| LABEL(Sender Data) | I-LOC |
| tab | I-LOC |
| , | O |
| enter | B-ACT |
| anonymous | B-VAL |
| in | O |
| the | B-TGT |
| LABEL(name) | I-TGT |
| textbox | I-TGT |
| for | B-DSC |
| anonymous | I-DSC |
| feedback | I-DSC |

As can be seen from Table 4 the enter token is marked as the action, and the name textbox is marked as the target. There is a value, anonymous, that is to be entered in the text box. Finally, location information is identified (the target is in the Sender Data tab), and a verbose explanation of the instruction's intent.

The tuple generation process 408 derives a set of tuples from the sequence of annotated atomic steps. Based on the output obtained from the step annotation stage 406, the tuple generation process 408 utilizes the following rules to generate tuples from an annotated step:

1. Single target: generate a single tuple.
2. Multiple targets, no values: distribute the action across the targets, generating as many tuples as targets in the step.
3. Multiple (target, value) pairs: generate a tuple for every target; using the corresponding value as the data component of the tuple.

These three rules define how to map a single action plus multiple targets and values to a sequence of tuples. With respect to the first rule, for a single target the tuple generation process 408 only needs to group the single target with the action and any data (i.e., a value chunk) present in the step. For example, for the step "click ok" the resulting tuple is (click, ok, •). Rule 2 refers to steps with multiple targets and no data, such as "click remember me and login". In this case the tuple generation process 408 distributes the action across all the available targets, to obtain (click, remember me, •) and (click, login, •). When the tuple generation process 408 finds a sequence of targets, some or all of them paired with a following data region, this indicates that the tuple generation process 408 is processing a multiple data entry step. Instructions to fill in a form usually follow this pattern. For example consider the instruction "enter first name as John, last name as Doe". According to rule 3, the tuple generation process 408 generates one tuple for each (target, value) pair in the instructions. This results in the tuples (enter, first name, John) and (enter, last name, Doe).

The tuple generation process 408 also takes into consideration location regions, which specify spatial relations that help to locate targets. In one embodiment, the tuple generation process 408 considers two relations 1.) containment (e.g., "click the ok button inside the checkout tab") and 2.) relative placement (e.g., "click the search button next to the settings link"). Containment relations result in an extra tuple to select the target's container before performing an action on the target. For the containment example above, the tuple generation process 408 obtains the tuples (click, checkout tab, •) and (click, ok button, •). The first tuple ensures the container for the "ok" button has focus, while the second one performs the intended "click" action on the "ok" button. Relative placement relations can be useful for avoiding ambiguity. For example, if there are two buttons with label "b", one next to a panel "p" and another besides a panel "q", an instruction can be written as "click the b button next to panel p" to unambiguously refer to the first button.

Tuple Interpretation

Figure 5:
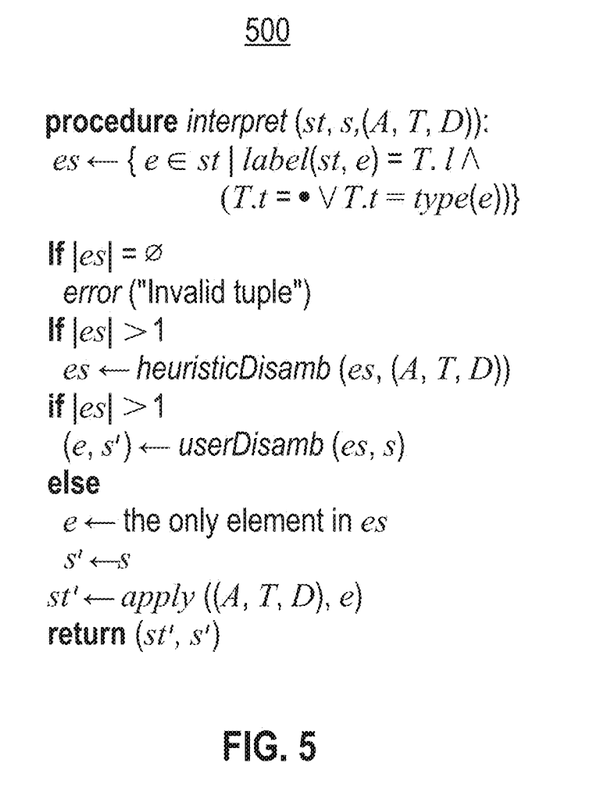
FIG. 5 shows one example of pseudo-code for interpreting tuples generated during the tuple extraction process of FIG. 4 according to one embodiment of the present invention.

The following is a more detailed discussion on interpreting intermediate representations (i.e., tuples) of a test step. Once a test step is converted into its immediate representation the test interpreter 114 interprets the resulting tuples against the application under test. FIG. 5 shows one example of pseudo-code 500 for the interpretation process performed by the test interpreter 114.

Here, st is the current application state, s is the textual representation of the current step, and (A, T, D) is the tuple to interpret. The test interpreter 114 starts by resolving the target denoted by T. To resolve the target the test interpreter 114 collects the set es of all the available GUI elements from the application state for which the tuple applies. If es is empty, the tuple is invalid. If there are multiple candidate elements, the test interpreter tries to narrow down the set by a heuristic disambiguation procedure. If multiple elements still exist after the heuristic disambiguation procedure the disambiguation manager 116 prompts the user to provide feedback. The test interpreter 114 then computes a new textual step s' using the user feedback. If user feedback was not required, s' is equals to s. Once the test interpreter computes the GUI element e denoted by T, the test interpreter 114 applies the tuple (A, T, D) to it, resulting in state st'. The test interpreter 114 then returns st' and the step s'.

Figure 6:
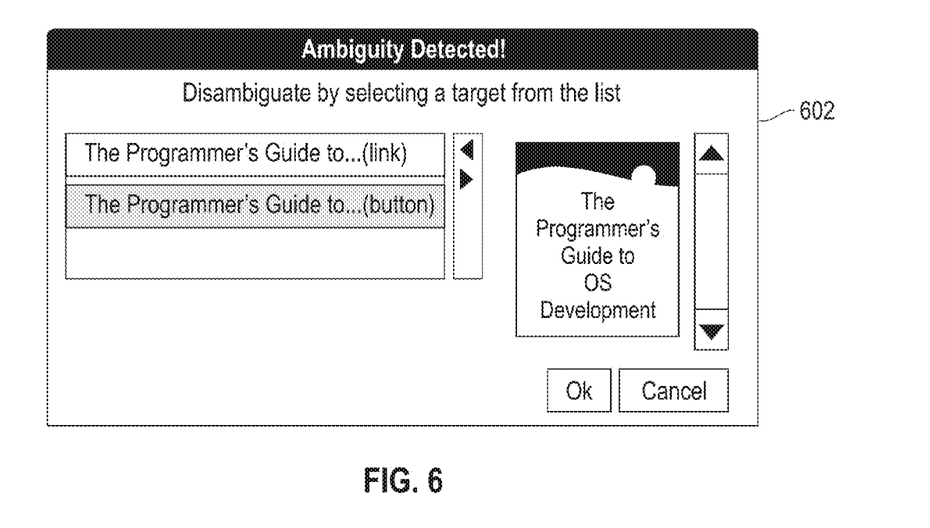
FIG. 6 shows one example of a prompt that is displayed to a user for providing feedback during a disambiguation operation of the tuple interpretation process of FIG. 5 according to one embodiment of the present invention.

The heuristic disambiguation procedure uses the (A, T, D) tuple to narrow down the candidate set to a single element. For example, if there is a tuple (enter, Search, books) and the candidates are an input field and a button, the former is being referred to since entering some text applies to input fields, not buttons. Therefore, the test interpreter 114 can discard the button, ending up with a single candidate element. If multiple candidates still exist after this procedure, the disambiguation manager 116 prompts the user to disambiguate. In one embodiment, the disambiguation manager 116 presents a dialog to the user with the list of candidate elements, as shown in FIG. 6. For example, FIG. 6 shows a window 602 being displayed to the user for disambiguating a test step associated with a test for performing a book search on a web application. The ambiguous step in this example is "click The Programmer's Guide to OS Development", wherein there is a link with the title "The Programmer's Guide to OS Development" and a button with the image of the cover of the book "The Programmer's Guide to OS Development". Therefore, the ambiguity is whether the link of button should be selected.

Therefore, the disambiguation manager 116 presents the window 602 to the user prompting the user to select either the link or the button for the instruction. In other words, the window 602 comprises selectable representations of each of the at least two GUI elements causing the ambiguity. Once the user provides his/her selection or feedback, the test interpreter 114 can proceed to apply the action to the user's selection. The user's answer is used to compute a new test step s' reflecting the answer. In the above example, if the user picks the link option, the step is adjusted to click the "The Programmer's Guide to OS Development" link. Applying an (A, T, D) tuple to a GUI element e involves programmatically emulating the action A on e. For example, if A="click" the test interpreter 114 generates a click event on e, and if A="type", the test interpreter 114 sets e's value to D. Synonyms of actions are also applicable such as "press" for "click", or "type" and "fill in" for "enter".

As can be seen from the above discussion, one or more embodiments of the present invention provide a machine learning-based algorithm for converting a test into an intermediate representation suitable for automated execution. Various embodiments also provide a semi-automated algorithm for interpreting the intermediate representation derived from a test, requesting feedback from the user if the intermediate representation cannot be unambiguously interpreted. This feedback is used to create an equivalent test with no ambiguous steps. Once the equivalent test is generated one or more embodiments automatically execute the equivalent test.

The above process performed by the test automation manager 108 frees programmers from the tedious task of writing code for functional tests, and testers from the burden of manual step execution (provided the interpreter does not require user intervention at every step). One advantage of this test automation of process is that it only prompts the user during the first execution of a test and only for ambiguous test steps/instructions. Also, since some embodiments of the present invention generate manual tests instead of code the cost of maintaining these tests over time is reduced.

Operational Flow Diagrams

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
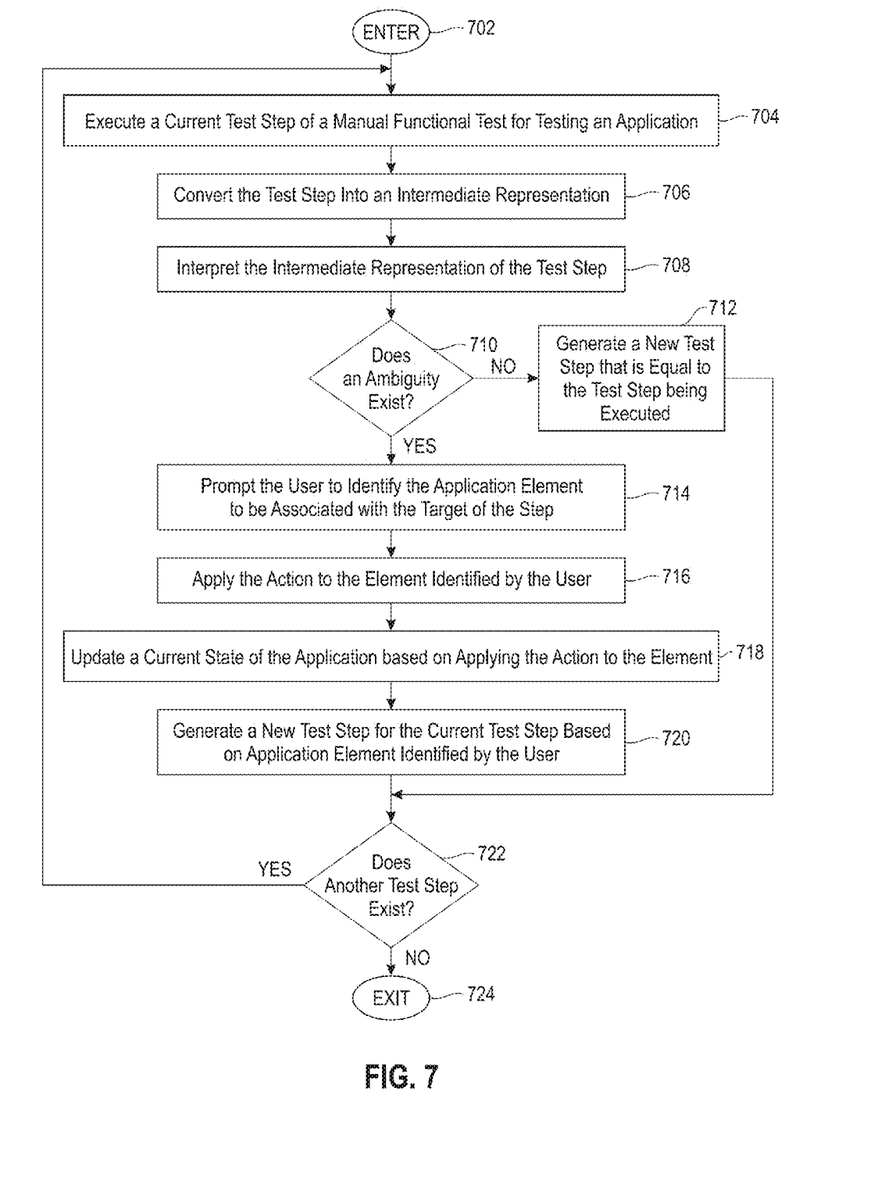
FIG. 7 is an operational flow diagram illustrating another example of an overall process of a manual functional test automation process according to one embodiment of the present invention.

FIG. 7 is an operational flow diagram illustrating one overview of a process for manual test automation process. It should be noted that a more detailed discussion with respect each of the steps shown in FIG. 7 has already been given above with respect to FIGS. 2-6. The operational flow of FIG. 7 starts at step 702 and flows directly into step 704. The test automation manager 108, at step 704, executes a current step of a manual functional test 110 for testing an application. The manual functional test 110 comprises a set of test steps, wherein each test step in the set of test steps comprises at least one action and one target of the action. The manual functional test 110 is associated with an application comprising a set of objects represented by a set of graphical user interface (GUI) elements.

The test automation manager 108, at step 706, converts the test step into an intermediate representation. This intermediate representation comprises at least one tuple that includes at least one action intended by the test step, at least one target for each action, and optionally any data associated with the test step. This conversion process has been discussed above in greater detail with respect to FIG. 4. For example, the test automation manager 108 performs a tuple extraction process that involves label replacement, step segmentation, step annotation, and tuple generation stages/processes. In one embodiment, the label replacement process identifies a label associated with each GUI element in the set of GUI elements. Each of the identified labels is then stored, for example, in a table. A plurality of n-grams in the current test step is calculated. An n-gram is a contiguous sequence of n-items (e.g., syllables, words, letters, phonemes, etc.) from given sequence of text/speech. Each n-gram in the plurality of n-grams is compared to each label that has been stored. Based on the comparing, at least one n-gram that is associated with a target label is identified. This n-gram is then replaced with a label variable.

The segmentation process, in this embodiment, segments the current test step into at least one atomic test step comprising at least one action verb and the label variable. The step annotation process, in this embodiment, identifies each token within the at least one atomic test step. Each identified token is annotated with a set of labels. A token referring to an action of the at least one atomic test step, and at least one token referring to at least one target of at the at least one atomic test step are identified based on the set of labels. The tuple generation process, in this embodiment, then generates a tuple for each of the at least one identified targets, wherein the generated tuple comprises at least the token referring to an action and at least the token referring to the identified target.

The test automation manager 108, at step 708, then interprets the intermediate representation of the test step. The intermediate representation interpretation process has been discussed above in greater detail with respect to FIG. 5. The test automation manager 108, at step 710, determines if an ambiguity exits with respect to the test step as part of the intermediate representation interpretation process. For example, the test automation manager 108 determines if at least two of the GUI elements in the set of GUI elements are associated with the target of the current test step. This determination can be performed by computing, for each GUI element in the set of GUI elements, a label associated with the GUI element based on a current state of the application. The current state of the application reflects an application of actions from previous test steps in the set of test steps to the set of GUI elements. For each GUI element in the set of GUI elements, a type of the GUI element is then determined. A label and a type associated with the target of the current test step is compared to the label and type of each GUI element in the set of GUI elements. Based on this comparison a determination can be made whether the label and the type of at least two of the GUI elements match the label and type of the target of the current test step. If this determination process is positive then an ambiguity exists. If this determination process is negative an ambiguity does not exist.

If am ambiguity does not exist, the test automation manager 108, at step 712, generates a new test step that is equal to the test step being executed and is executable automatically without any user intervention. The control the flows to step 722. If an ambiguity does exist, the test automation manager 108, at step 714, prompts the user to provide a selection of one of the at least two GUI elements for association with the target of the current test step. For example, the test automation manager 108 can present a window 602 to the user via a user interface 118, where the window 602 comprises a selectable representation of each of the at least two GUI elements.

Responsive to receiving the selection from the user, the test automation manager 108, at step 716, applies the action of the current test step (as identified in the tuple of the intermediate representation of the test step) to the GUI element identified by user. The test automation manager 108, at step 718, then updates a current state of the application to reflect the application of the action to the GUI element selected by the user. Responsive to receiving the selection from the user, the test automation manager 108, at step 720, also generates a new test step corresponding to the current test step being executed. The new test step associates the GUI element selected by the user with the target of the current test step. The new test step is designated for automatic execution, without user intervention, in place of the current test step for subsequent executions of the current test step. The test automation manager 108, at step 722, determines if a subsequent test step exists within the manual functional test 110. If the result of this determination is negative, the control flow exits at step 724. If the result of this determination is positive, the control flow returns to step 704.

Information Processing System

Figure 8:
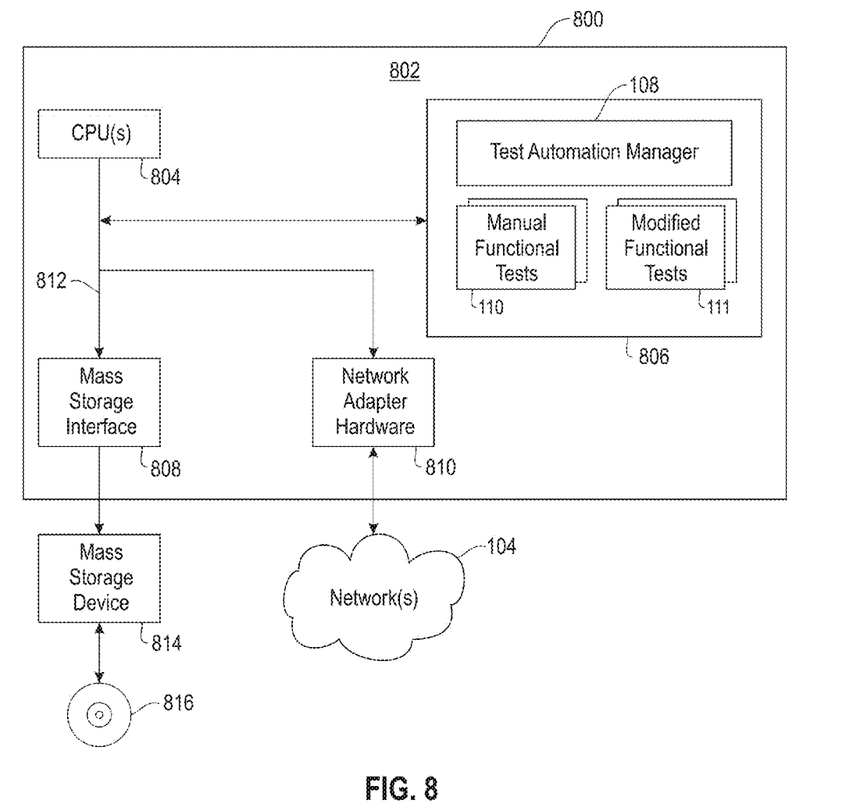
FIG. 8 is a block diagram illustrating a detailed view of an information processing system according to one embodiment of the present invention.

Referring now to FIG. 8, this figure is a block diagram illustrating an information processing system that can be utilized in embodiments of the present invention. The information processing system 800 is based upon a suitably configured processing system adapted to implement one or more embodiments of the present invention (e.g., the user system 102 and/or the server system 106 of FIG. 1). Any suitably configured processing system can be used as the information processing system 800 in embodiments of the present invention.

The information processing system 800 includes a computer 802. The computer 802 has a processor(s) 804 that is connected to a main memory 806, mass storage interface 808, and network adapter hardware 810. A system bus 812 interconnects these system components. Although only one CPU 804 is illustrated for computer 802, computer systems with multiple CPUs can be used equally effectively. The main memory 806, in this embodiment, the test automation manager 108 and its components, manual functional tests 110 and modified functional tests 111. In another embodiment, the test automation manager 108 can reside within the processor 804, or be a separate hardware component.

The mass storage interface 808 is used to connect mass storage devices, such as mass storage device 814, to the information processing system 800. One specific type of data storage device is an optical drive such as a CD/DVD drive, which can be used to store data to and read data from a computer readable medium or storage product such as (but not limited to) a CD/DVD 816. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 800. The network adapter hardware 810 is used to provide an interface to a network 104. Embodiments of the present invention are able to be adapted to work with any data communications connections including present day analog and/or digital techniques or via a future networking mechanism.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium (s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   executing a current test step of a functional test comprising a set of test steps, wherein each test step comprises at least one action and one target of the action, and wherein the functional test is associated with an application comprising a plurality of objects to be tested;
   determining that at least two of the objects in the plurality of objects are associated with a target of the current test step;
   prompting a user to provide a selection of one of the at least two objects for association with the target of the current test step; and
   generating a new test step corresponding to the current test step being executed based on a selection by the user of one of the at least two objects, wherein the new test step associates the selected object with the target of the current test step, and wherein the new test step is designated for automatic execution in place of the current test step for subsequent executions of the current test step.

2. The method of claim 1, wherein the determining comprises:
   identifying, for each object in the plurality of objects, a label associated with the object based on a current state of the application, wherein the current state of the application is based on actions from previous test steps having been applied to the plurality of objects;
   determining, for each object in the plurality of objects, a type of the object;
   comparing a label and a type associated with the target of the current test step to the label and type of each object in the plurality of objects; and
   determining, based on the comparing, that the label and the type of the at least two of the objects match the label and type of the target of the current test step.

3. The method of claim 1, wherein the prompting comprises:
   presenting a selectable representation of each of the at least objects to the user.

4. The method of claim 1, further comprising:
   applying the action to the object selected by the user; and
   updating a current state of the application to reflect the application of the action to the object selected by the user.

5. The method of claim 1, wherein executing the current test step further comprises:
   converting the current test step into at least one tuple comprising at least the action intended by the current test step and the target of the action.

6. The method of claim 5, wherein the converting comprises:
   identifying a label associated with each object in the plurality of objects;
   storing each of the identified labels;
   calculating a plurality of n-grams in the current test step;
   comparing each n-gram in the plurality of n-grams to each label that has been stored;
   identifying, based on the comparing, at least one n-gram that is associated with a target label; and
   replacing the at least one n-gram with a label variable.

7. The method of claim 6, wherein the converting further comprises:
   segmenting the current test step into at least one atomic test step comprising one action and the label variable.

8. The method of claim 7, wherein the converting further comprises:
   identifying each token within the at least one atomic test step;
   annotating each identified token with a set of labels; and
   identifying, based on the set of labels, a token referring to an action of the at least one atomic test step, and at least one token referring to at least one target of at the at least one atomic test step.

9. The method of claim 8, wherein the converting further comprises:
   generating a tuple for each of the at least one identified targets, wherein the generated tuple comprises at least the token referring to an action and at least the token referring to the identified target.

* * * * *